(12) United States Patent
Pfaff

(10) Patent No.: US 8,672,390 B1
(45) Date of Patent: Mar. 18, 2014

(54) AERODYNAMIC DRAG REDUCER FOR A TRAILER

(76) Inventor: Raimund Pfaff, Carter Lake, IA (US)

( * ) Notice: Subject to any disclaimer, the term of this patent is extended or adjusted under 35 U.S.C. 154(b) by 0 days.

(21) Appl. No.: 13/595,403

(22) Filed: Aug. 27, 2012

(51) Int. Cl.
*B62D 35/02* (2006.01)
*B60R 9/00* (2006.01)

(52) U.S. Cl.
USPC ........................................ 296/180.4; 180/903

(58) Field of Classification Search
USPC ............ 296/180.1–180.5, 208; 280/850, 851; 180/181
See application file for complete search history.

(56) References Cited

U.S. PATENT DOCUMENTS

| 4,357,047 A * | 11/1982 | Katz ........................... 296/186.1 |
| 4,626,022 A * | 12/1986 | Booher ....................... 296/184.1 |
| 6,558,765 B2 * | 5/2003 | Padmanabhan ................. 428/54 |
| 7,100,971 B2 * | 9/2006 | Pines ......................... 296/186.1 |
| 2004/0009049 A1 * | 1/2004 | Booher ........................... 410/47 |
| 2011/0223328 A1 * | 9/2011 | Padmanabhan ............ 427/208.2 |

* cited by examiner

*Primary Examiner* — Glenn Dayoan
*Assistant Examiner* — Sunsurraye Westbrook
(74) *Attorney, Agent, or Firm* — Dennis L. Thomte; Thomte Patent Law Office LLC

(57) ABSTRACT

An aerodynamic reducer for a trailer comprising one or more sheet members which are secured to the lower ends of at least some of the cross-members positioned beneath the floor of the trailer. The sheet members enclose the space between at least some of the cross-members.

5 Claims, 5 Drawing Sheets

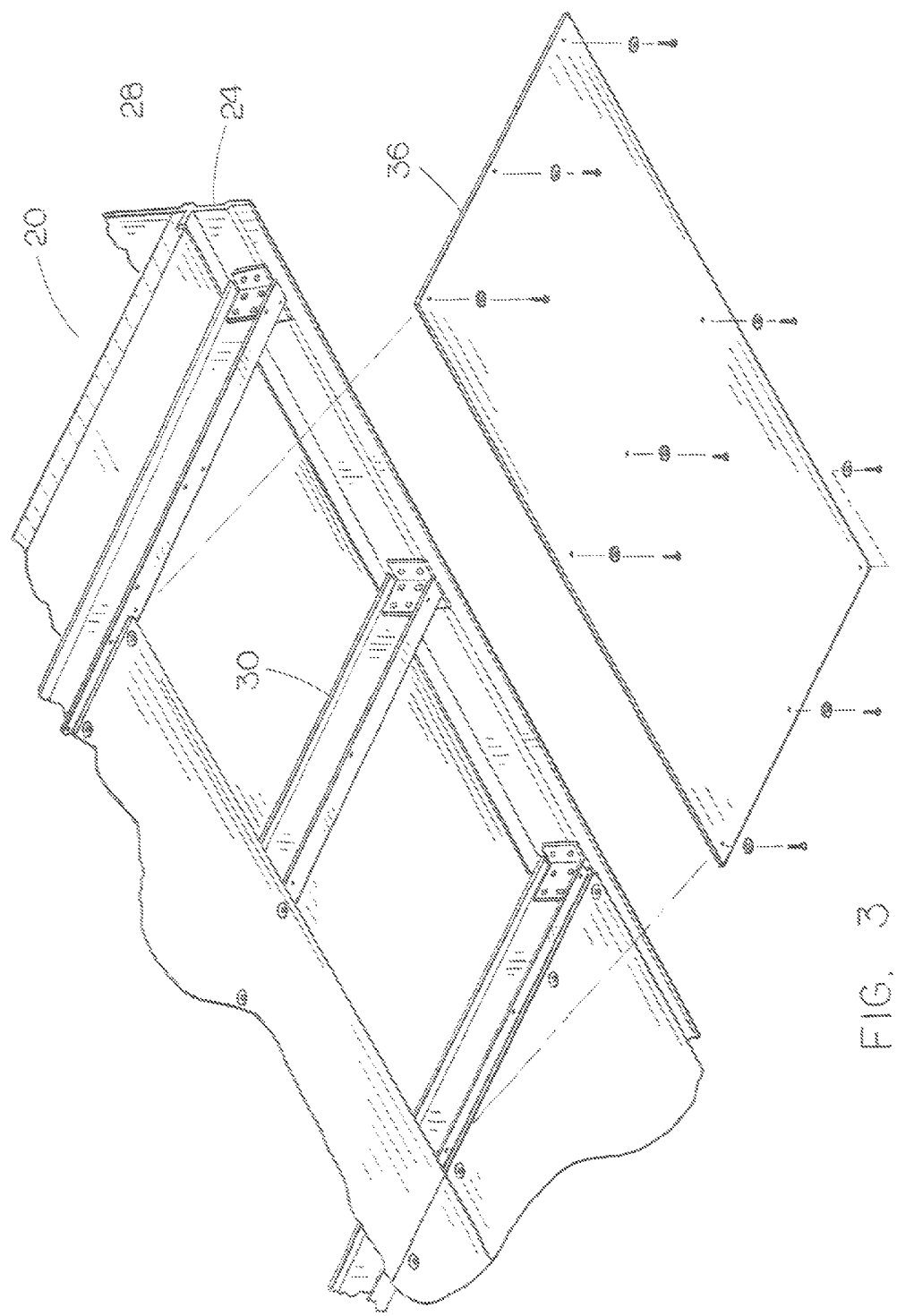

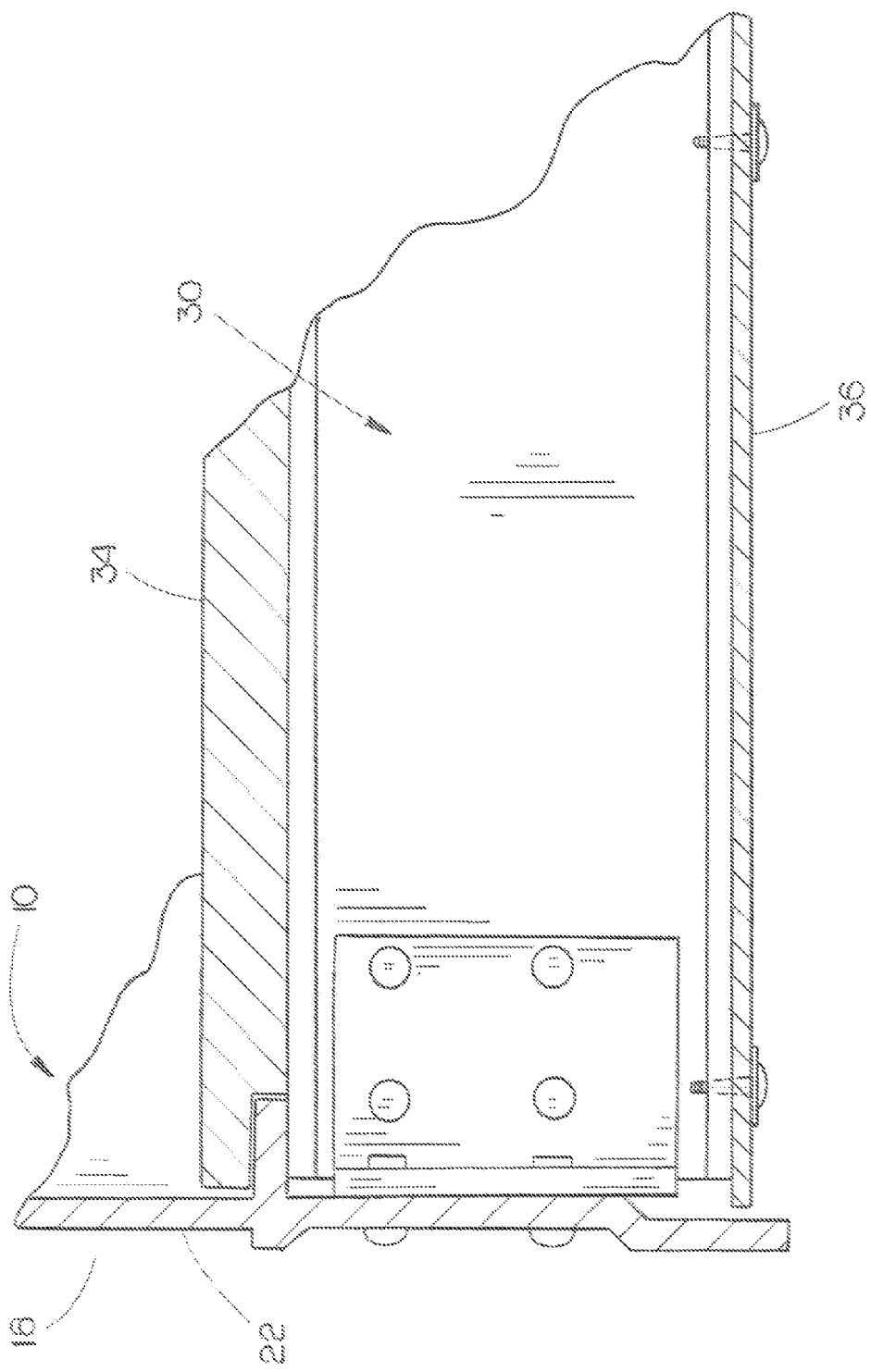

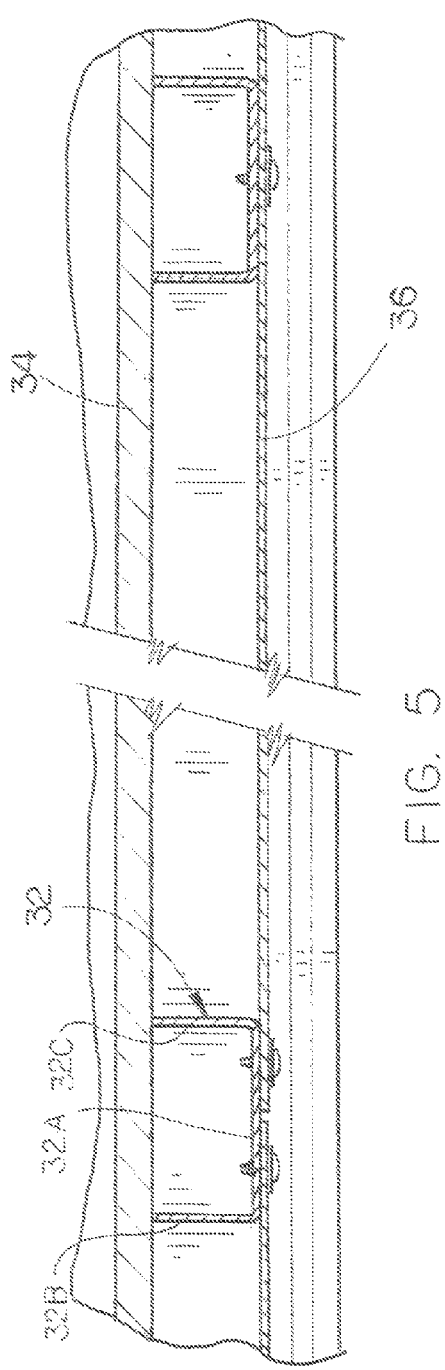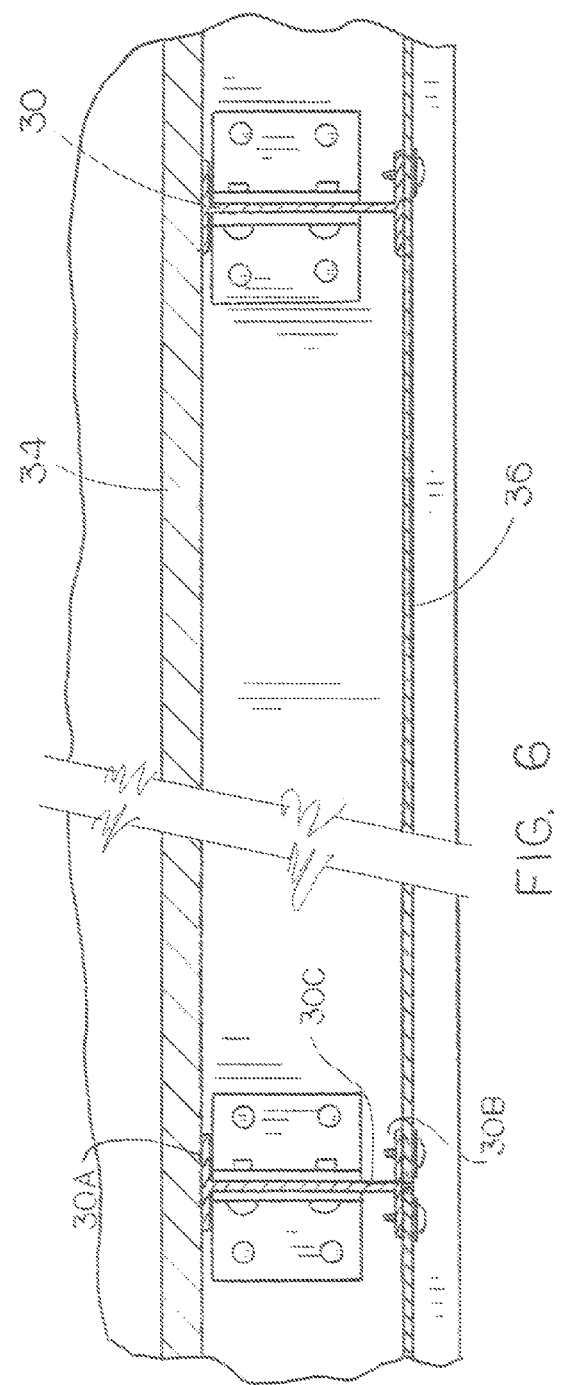

AERODYNAMIC DRAG REDUCER FOR A TRAILER

BACKGROUND OF THE INVENTION

1. Field of the Invention

This invention relates to an aerodynamic drag reducer for a trailer and more particularly to an aerodynamic drag reducer for a trailer which is secured to some of the floor supporting cross-members thereof to enclose the cross-members to prevent the air flow of cross-winds from entering the space between the cross-members.

2. Description of the Related Art

A vast majority of trailers have right and left lower side rails which extend longitudinally along the lower sides of the trailer. A plurality of cross-members are secured to the lower side rails and extend therebetween to strengthen the trailer and to provide a support structure for the floor of the trailer.

As the trailer is being pulled by a tractor or truck, the trailer is often subjected to cross-winds. As the air flow from a cross-wind passes beneath the side of the trailer, the air flow swirls and moves upwardly between the cross-members thereby creating air turbulence and aerodynamic drag on the trailer which adversely affects the fuel mileage of the tractor or truck.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An aerodynamic drag reducer is provided for a trailer which has a generally horizontally disposed floor, having upper and lower sides, and which has a forward end, a rearward end, a first side and a second side. The floor of the trailer is supported upon a plurality of transversely extending and horizontally spaced-apart cross-members which are positioned below the floor with the cross-members having upper and lower ends.

A flat sheet member is secured to the lower ends of at least some of the cross-members and which extends therebetween to enclose the cross-members. When the trailer experiences a cross-wind, the air passing beneath the sides of the trailer is prevented from swirling upwardly into the spaces between the cross-members thereby preventing air turbulence therebetween which would otherwise create an aerodynamic drag upon the trailer thereby adversely affecting the fuel mileage of the tractor or truck pulling the trailer.

A principal object of the invention is to provide an improved aerodynamic drag reducer for a trailer.

A further object of the invention is to provide an aerodynamic drag reducer for a trailer which encloses some of the cross-members of the trailer which support the floor of the trailer.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a partial exploded perspective view illustrating the manner in which the drag reducer of this invention is secured to the lower ends of the cross-members of the trailer;

FIG. 4 is a partial sectional view illustrating the manner in which the aerodynamic drag reducer of this invention is secured to the lower ends of the cross-members;

FIG. 5 is a partial sectional view illustrating the drag reducer of this invention secured to one form of the cross-members; and FIG. 6 is a sectional view similar to FIG. 5 except that the cross-members are shown to be I-beams.

DESCRIPTION OF THE PREFERRED EMBODIMENT

Figure 1:
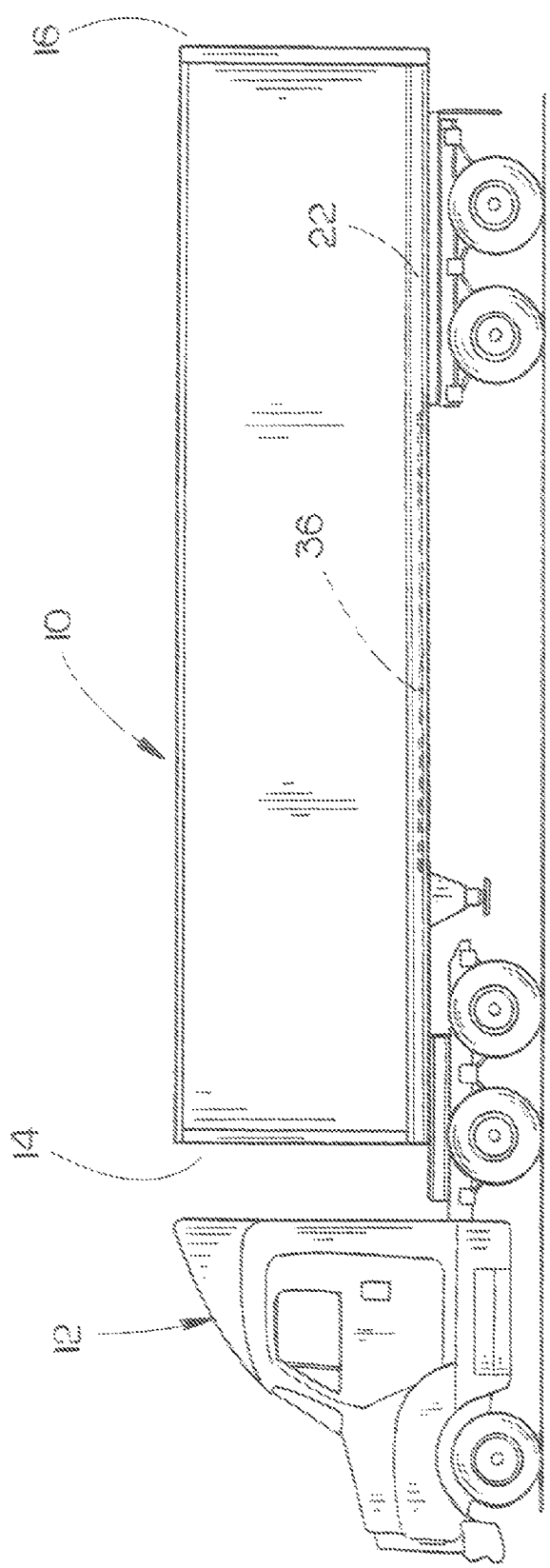
FIG. 1 is a side view of a conventional semi-trailer having the drag reducer of this invention mounted there on which is shown in broken lines.
Figure 2:
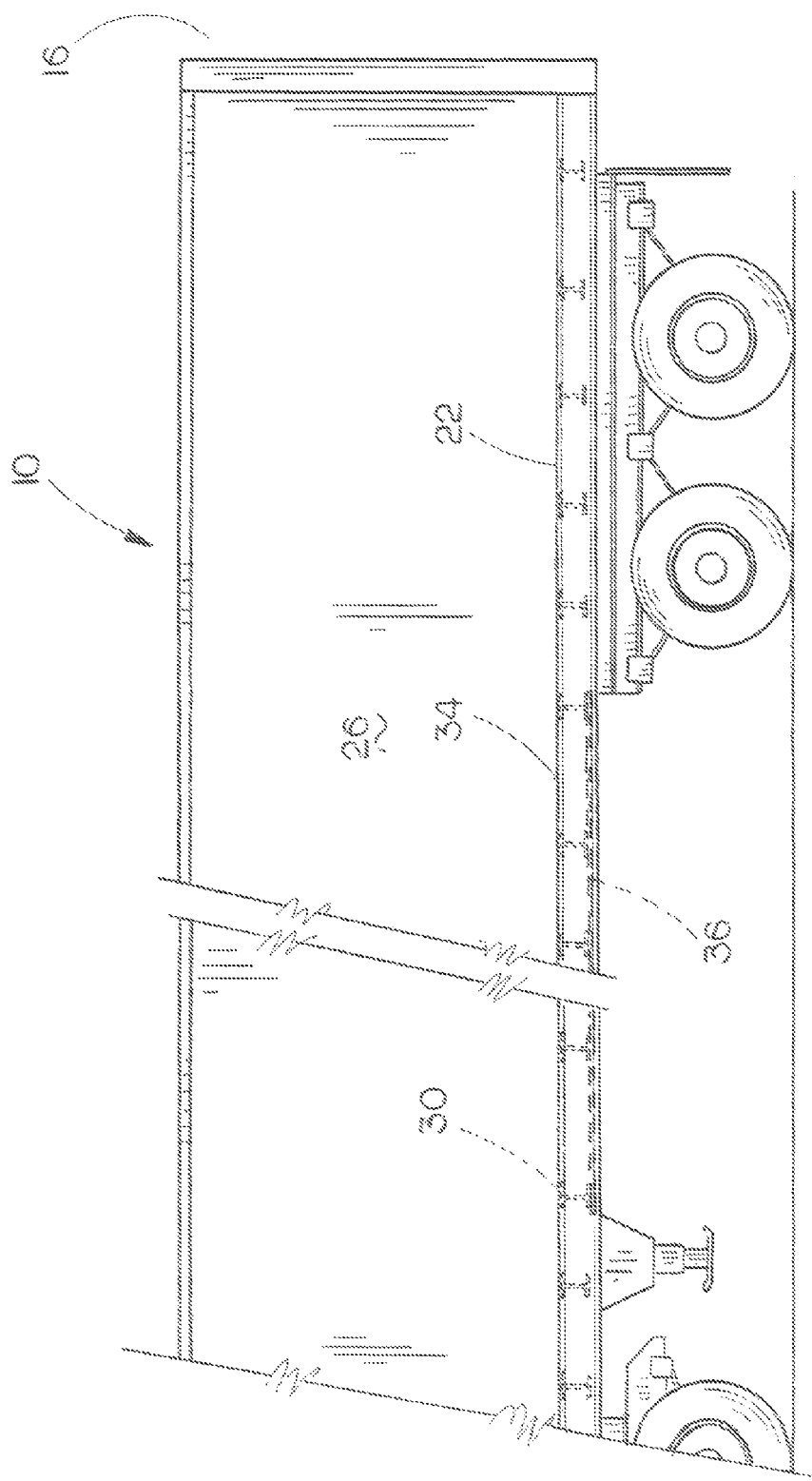
FIG. 2 is a partial side elevational view which illustrates cross-members of the trailer and the drag reducer of this invention illustrated in broken lines.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional trailer which is designed to be pulled by a tractor or truck 12. Trailer 10 will be described as having a forward end 14, a rearward end 16, a left side 18 and a right side 20. Most trailers 10 have a left lower side rail 22 and a right lower side rail 24 which have the lower ends of side walls 20 and 28 secured thereto in conventional fashion. A plurality of transversely extending cross-members 30 or 32 are secured to and extend between the lower side rails 18 and 20 and have a floor 34 supported thereon. FIGS. 3, 4 and 5 illustrate that the cross-members 30 are of I-beam configuration. FIG. 5 illustrates that the cross-members 32 are channel-shaped. The I-beam cross-members include a flange 30A, a lower flange 30B and a web 30C extending therebetween. Cross-members 32 include a lower base portion 32A with legs 32B and 32C extending upwardly therefrom.

As the trailer experiences a cross-wind, the air flow from the cross-wind impinges upon the side walls and passed therebelow. As the air flow from the cross-wind passes below the windward lower side rail, the air flow becomes turbulent and passes upwardly between the cross-members thereby creating an aerodynamic drag on the trailer which decreases the fuel mileage of the tractor 12. It is for that reason that the instant invention is provided.

The aerodynamic drag reducer of this invention is referred to generally by the reference number 36 and is comprised of one or more flat sheet members which are secured to the lower ends of at least some of the cross-members 30 or 32 to prevent the air flow of the cross-wind from swirling upwardly between the cross-members thereby reducing the aerodynamic drag on the trailer. The sheet members 36 may be fabricated from metal or plastic.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An aerodynamic drag reducer for a trailer having a generally horizontally disposed floor having upper and lower sides and which has a forward end, a rearward end, a first side and a second side, with the floor being supported upon a plurality of transversely extending and horizontally spaced-apart cross-members positioned therebelow with the cross-members having upper and lower ends, comprising:
 a flat sheet member secured to the lower ends of at least some of the cross-members which extends therebetween to enclose the cross-members.

2. The drag reducer of claim 1 wherein said flat sheet member prevents the air flow of cross-winds from entering the space between adjacent cross-members.

3. The drag reducer of claim 1 wherein the cross-members are I-beams with an upper flange, a lower flange and a web extending therebetween, and wherein said flat sheet member is secured to at least some of the lower flanges of the I-beams.

4. The drag reducer of claim 1 wherein the cross-members are channel members having a first upstanding leg having upper and lower ends, a second upstanding leg having upper and lower ends, and a base portion extending between the lower ends of the first and second upstanding legs and wherein said sheet member is secured to at least some of the base portions of the channel members.

5. The method of reducing the drag of a trailer having a generally horizontally disposed floor having upper side, a lower side, a forward end, a rearward end, a first side and a second side, with the floor being supported upon a plurality of transversely extending and horizontally spaced-apart cross-members positioned therebelow with the cross-members having upper and lower ends, comprising the steps of:
 positioning a flat sheet member below at least some of said cross-members so as to extend therebetween; and
 securing the flat sheet member to the lower ends of at least some of the cross-members so as to enclose the cross-members thereby preventing the air flow from cross-winds from entering the space between adjacent cross-members.

* * * * *